(12) United States Patent
Lienard et al.

(10) Patent No.: US 7,599,575 B2
(45) Date of Patent: Oct. 6, 2009

(54) METHOD AND APPARATUS FOR REDUCING NOISE IN A SEQUENCE OF FLUOROSCOPIC IMAGES

(75) Inventors: Jean Lienard, Igny (FR); Vincent Auvray, Paris (FR); Vincent Jonas Bismuth, Paris (FR); Benjamin Didier Réne Wimille, Versailles (FR)

(73) Assignee: General Electric Corporation, Schenectady, NY (US)

( * ) Notice: Subject to any disclaimer, the term of this patent is extended or adjusted under 35 U.S.C. 154(b) by 605 days.

(21) Appl. No.: 11/409,836

(22) Filed: Apr. 24, 2006

(65) Prior Publication Data

US 2007/0058780 A1 Mar. 15, 2007

(30) Foreign Application Priority Data

Apr. 26, 2005 (FR) .................................. 05 04164

(51) Int. Cl.
*G06K 9/36* (2006.01)
(52) U.S. Cl. ....................... 382/274; 382/260; 382/275; 358/3.26; 358/3.27
(58) Field of Classification Search ................. 382/260, 382/274, 275; 358/3.26, 3.27, 463
See application file for complete search history.

(56) References Cited

U.S. PATENT DOCUMENTS

| 4,613,894 | A | 9/1986 | Catros et al. |
| 6,151,417 | A | 11/2000 | Florent et al. |
| 6,243,439 | B1 * | 6/2001 | Arai et al. ..................... 378/20 |
| 6,314,160 | B1 | 11/2001 | Dhawale et al. |
| 6,587,539 | B2 * | 7/2003 | Oikawa ....................... 378/19 |
| 6,768,811 | B2 * | 7/2004 | Dinstein et al. ............. 382/128 |
| 7,087,021 | B2 * | 8/2006 | Paternostro ................. 600/443 |
| 7,180,074 | B1 * | 2/2007 | Crosetto ................ 250/370.09 |

FOREIGN PATENT DOCUMENTS

EP 0 502 615 A 9/1992

* cited by examiner

*Primary Examiner*—Yosef Kassa
(74) *Attorney, Agent, or Firm*—Global Patent Operation (57) ABSTRACT

A method and apparatus for reduction of noise in an image of a sequence of fluoroscopic images of an object in motion having a differentiation of the pixels of the image between pixels in motion and fixed pixels, and a processing wherein a time filtering operation of the fixed pixels. For each pixel of the image, the differentiation between a pixel in motion and a fixed pixel is performed as a function of the result of a detection of motion during which, in a zone of the image covering a set of pixels in the vicinity of the pixel, the existence or respectively the absence of motion of the object relative to a preceding image is detected.

41 Claims, 4 Drawing Sheets

FIG_4

FIG.5

METHOD AND APPARATUS FOR REDUCING NOISE IN A SEQUENCE OF FLUOROSCOPIC IMAGES

CROSS-REFERENCE TO RELATED APPLICATIONS

This application claims the benefit of a priority under 35 USC 119 (a)-(d) to French Patent Application No. 05 04164 filed Apr. 26, 2005, the entire contents of which are hereby incorporated by reference.

BACKGROUND OF THE INVENTION

The field of the invention is radiology and particularly medical imaging and more particularly a method and system or apparatus for X-ray fluoroscopy. An embodiment of the invention relates to a method and an apparatus for attenuating or reducing noise in images acquired by means of a fluoroscopic X-ray apparatus or system.

In the field of medical imaging, it is well known to utilize fluoroscopic images to aid guidance of surgical instruments during an operation or surgical procedure. An operation or surgical procedure guided by fluoroscopic images is thus typically performed by passing a catheter inside the vascular network of a patient, while a contrast agent has been earlier injected into this vascular network so as to opacify the network and improve visibility of the vessels. The progress of the operation or surgical procedure is then followed by X-ray imaging. Such an operation or surgical procedure is generally relatively long, and it is thus necessary to limit the dose of X-rays to which the patient is subjected, in order to avoid causing lesions or burns to the tissue due to radiation. But due to this limitation of the dose of X-rays, fluoroscopic images obtained comprise a relatively high level of noise, likely to impair visibility of the operating instruments.

Filtering techniques are generally employed to decrease quantic noise present in these images. Techniques known under the name of Fluoroscopic Noise Reduction (FNR) is thus generally carried out on images acquired using the X-ray fluoroscopic system. The objective of this FNR processing is to filter the noise present in the image while maintaining the contrast of information present in the images. FNR processing is typically performed by applying a time filter to the regions of the images where there is no motion. Detection of the motion based on individual variation in the intensity of each of the pixels considered separately is then carried out to determine the existence or the absence of motion in the image. A pixel is thus considered as being in motion when its inter-image intensity variation exceeds a threshold linked to the standard deviation of the noise. These pixels determined as being in motion are not, or only slightly, filtered. However, processing via recursive time filtering is applied to the pixels determined as being fixed. U.S. Pat. No. 6,314,180 discloses an example of such FNR processing.

Such FNR processing nevertheless has certain disadvantages. In the event where motion detection is not corrected, fixed pixels, noisy but detected as being in motion, will remain noisy. In addition, the time filter will combine the pixels in motion that it falsely considers as being fixed with their preceding location. This combination risks consequently causing a reduction in contrast of these pixels and can even introduce phantom objects in the filtered image. In addition, due to the fact that the pixels determined as being in motion are not, or at the very least, filtered, so as to limit this phenomenon of shift, a group of pixels changing location will be followed by a tail of noisy pixels at the place where the group of pixels in question was located in the preceding image in the sequence of fluoroscopic images.

BRIEF DESCRIPTION OF THE INVENTION

There is thus a need for improved processing of fluoroscopic images that allows the noise present in these images to be reduced, while limiting the presence in the filtered images of artefacts due to shift and tails of noise following the objects in shift. An embodiment of the invention is a technique based on improved detection of an object in motion in a sequence of fluoroscopic images.

In an embodiment of the invention, a method for reduction of noise in an image from a sequence of fluoroscopic images of an object in motion, comprising a stage of differentiation of the pixels of the image between pixels in motion and fixed pixels, and a processing stage comprising an operation of time filtering of the fixed pixels, in that, for each pixel of the image, the differentiation between pixel in motion and fixed pixel is realized as a function of the result of a stage of detection of motion during which the existence or respectively the absence of motion of the object relative to a preceding image is detected in a zone of the image covering a set of pixels in the vicinity of the pixel.

An embodiment of the invention relates to a radiological apparatus comprising means for implementing an embodiment of the method.

BRIEF DESCRIPTION OF THE DRAWINGS

Other aspects and advantages of the present invention will be more clearly understood from the following detailed description of embodiments of the invention, given by way of non-limiting example, and with reference to the attached drawings, in which.

DETAILED DESCRIPTION OF THE INVENTION

Figure 1:
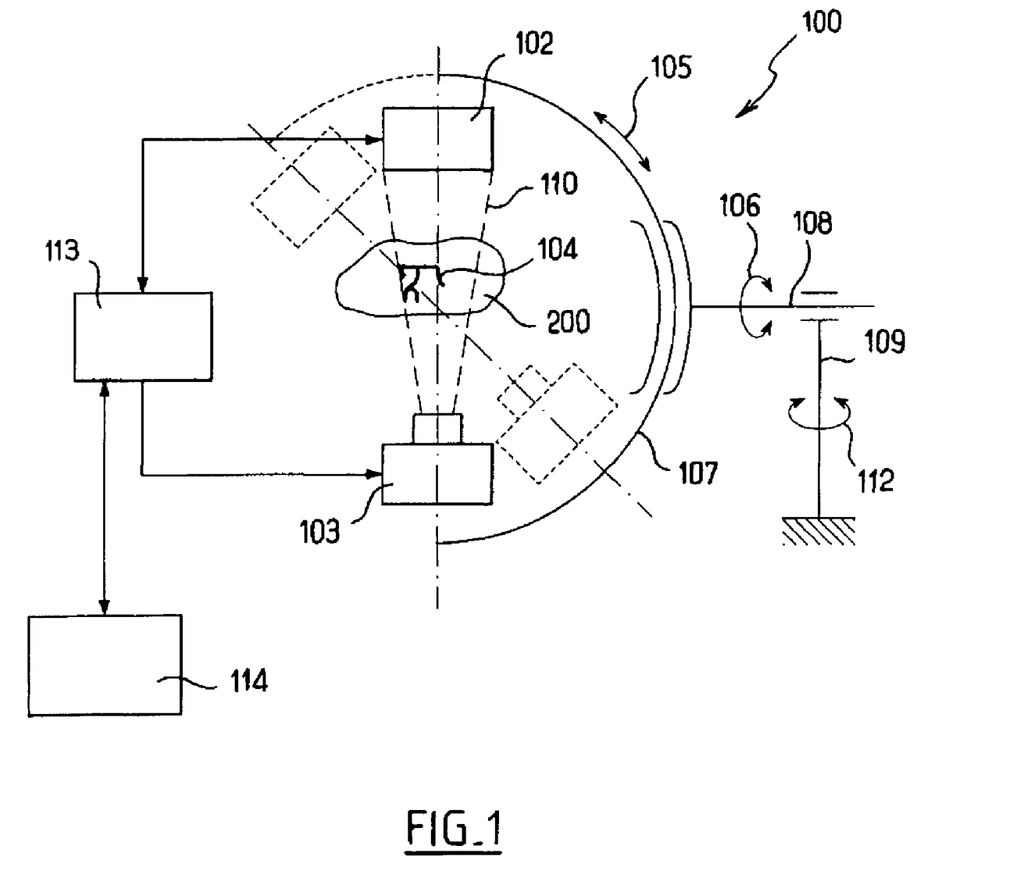
FIG. 1 is a schematic of a radiological apparatus suitable for implementing the method according to an embodiment of the invention.

FIG. 1 shows radiological apparatus 100 comprising means for radiographic exposure 102 and means for emission of radiation 103 in the form of a source of X-rays. The source of X-rays 103 and the means for radiographic exposure are fixed at each end of a carrier arm 107 serving as positioner, here resembling a semicircle. The semi-circular arm 107 is slidably linked to a second arm 108. The second arm 108 is in turn linked to rotate on the base 109 of the radiological apparatus 100. The base 109 is mounted in rotation 112 relative to the ground. The arm 108 is essentially suitable for effecting movements in rotation 106 about its own axis. The semicircular arm 107 is suitable for sliding relative to the arm 108, such that the semicircular arm describes rotary movement relative to the center of the semicircle forming the arm.

In use, the body of the patient 200 is positioned between the source of X-rays 103 and the means of radiographic exposure 102, on a support (not shown) such that a region of interest 104 of the patient 200 is located in the field 110 of the apparatus. The radiological apparatus 100 also comprises means for processing 113 comprising means for receiving data provided by the means for exposure 102 and for controlling the means for emission 103. The means for processing 113 is programmed to be capable of using a possible embodiment of the method. The apparatus 100 can also comprise a means for interface 114 coupled to the means for processing 113, comprising for example means for viewing of the screen type and means for command of the mouse type.

As previously described, detection of the motion for performing FNR filtering is conventionally performed by considering each pixel independently of one another. An embodiment of the invention considers motion detection based on an approach according to which it is not a single pixel considered, but a set of pixels of a zone of the image surrounding a particular pixel. So as to improve motion detection of an object in a sequence of images, a pixel can be considered as being in motion only if it belongs to a zone itself in motion. A motion detection criterion is then applied to the set of pixels belonging to the vicinity of a particular pixel.

In order to differentiate the pixels of the image between pixels in motion and fixed pixels, an embodiment of the method provides, for each pixel of the image, the carrying out of a detection stage of motion during which the existence or the absence of motion relative to a preceding image is detected in a zone of the image covering a set of pixels in the vicinity of the pixel. If the existence of the movement is proven over the entire zone surrounding a particular pixel, this pixel will be considered as being a pixel in motion. In the opposite case, this pixel will be considered as being a fixed pixel. The zone surrounding a particular pixel is a square window of size M, where M is an odd integer number such that the particular pixel is the central pixel of this zone.

Carrying out detection of the existence or the absence of motion of the object within the zone (window of size M) surrounding a particular pixel (central pixel) of an image, the invention includes counting the number of pixels among the pixels of the zone which offer a variation in amplitude between the image and a preceding image greater than a given threshold (the amplitude threshold), and comparing this number of pixels to a threshold (the motion detection threshold) to determine whether the particular pixel can be considered as being in motion.

Motion detection is described as follows. A filiform object in movement is considered, having a thickness d and amplitude of uniform contrast A relative to the background, in an image where the noise presents a standard deviation s. It is also possible to more generally consider an object which amplitude is statistically distributed with an average value A and a standard deviation a. The Contrast to Noise ratio (CNR) is thus equal to A/s.

Figure 2:
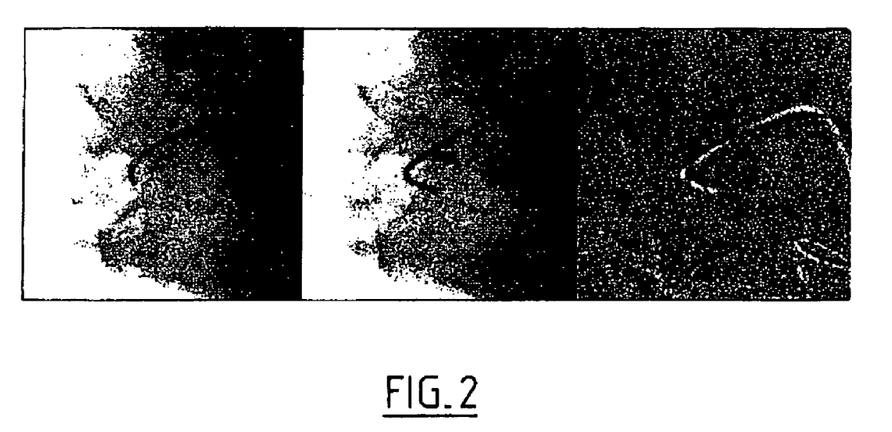
FIG. 2 illustrates to the left a fluoroscopic image acquired at the instant t in which an object in motion appears in black, at the center the fluoroscopic image acquired at the instant t−1, and to the right the image difference between the image of the center acquired at t−1 and the left image acquired at t presenting negative pixels (in black)/positive pixels (in white) at the locations of the object, as well as a level of grey nil for the fixed background pixels.

A difference image is determined comprising the difference between the fluoroscopic image acquired at the instant t−1 (central image in FIG. 2) and the fluoroscopic image acquired at the instant t (image on the left in FIG. 2). In this difference image, the pixels of the object has a positive amplitude (+A) or a negative amplitude (−A) as a function of the position of the object over time. As is apparent from the difference image to the right in FIG. 2, after the pixels of the object have left a particular position they appear in white on this image (variation in amplitude +A), whereas the pixels of the object arriving at a particular position appear in black on this image (variation in amplitude −A). In other words, on the difference image, the <<real>> object is observed in black in its position at the instant t, and the <<artificial>> object in white in its position at the instant t−1 (that is, the trace of the object).

Figure 5:
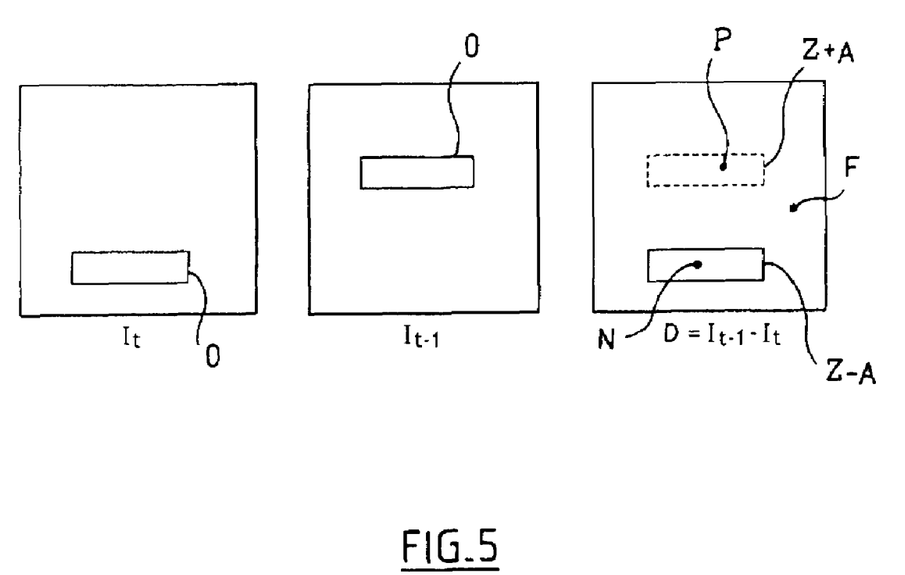
FIG. 5 is a schematic illustration of a series of images similar to that of FIG. 2.

FIG. 5 is a schematic illustration of a series of images similar to that in FIG. 2. In FIG. 5 to the left the image $I_t$ is shown, acquired at the instant t and representing an object O. At the center the image $I_{t-1}$ is shown illustrating the object O at its position at the instant t−1. To the right the difference image $D=I_{t-1}-I_t$ is shown, in which the position at the instant t of the object is represented by a zone $Z_{+A}$ having a positive amplitude +A, the position of the object at the instant t−1 (that is, the trace of the object) is represented by a zone $Z_{-A}$ having a negative amplitude −A.

The difference image is examined by means of a sliding window of size M*M. When the window fully covers the object, the number of points of the object is dM.

In the absence of motion, the $M^2$ points of the image difference are noisy points. Since the noise has a Gaussian distribution of density $N(0, s\sqrt{2})$, a number $M^2[1-F(z)]$ of points whereof the amplitude is more significant than A is counted, among the $M^2$ points (F representing the distribution function of the noise, and z being equal to the number of standard deviations s contained in A, that is $CNR/\sqrt{2}$).

In the event of motion of the object, the object presents, as an absolute value, an amplitude A in dM points, the rest of the pixels ($M^2$−dM) being noisy pixels. As a consequence, the pixels presenting an absolute amplitude greater than A are $T=dM+[M^2-dM][1-F(z)]$ in the difference image.

A motion detection law can then be expressed by: if the number of pixels of the image difference having an absolute amplitude greater than or equal to A (amplitude threshold) is greater than the motion detection threshold T, the central pixel will be considered as being in motion, and in the opposite case, this central pixel will be considered as being fixed.

In another embodiment of motion detection, a simpler law can be considered, for example a majority law being expressed according to: on a window of size M*M, if the number of pixels whereof the absolute amplitude is greater than A (amplitude threshold) is greater than or equal to $1+M^2/2$ (motion detection threshold), then the central pixel will be considered as being in motion The table below specifies examples of values of motion detection threshold according to the two rules presented below, for a window of size M, in the case where the CNR ratio is 1, and the object is of size d=1.

| M | $M^2$ | T | Majority |
|---|---|---|---|
| 3 | 9 | 5 | 5 |
| 5 | 25 | 11 | 13 |
| 7 | 49 | 18 | 25 |
| 9 | 81 | 27 | 41 |
| 11 | 121 | 38 | 61 |

The motion detection described above enables differentiation of the pixels in three classes. In a first class those pixels in motion are considered for which a number has been confirmed in the vicinity of the latter greater than the motion detection threshold of pixels presenting a variation in negative amplitude less than the negative value of the amplitude threshold (A); these pixels are then considered as corresponding to a zone where the object is in motion (for example pixel N of FIG. 5). In a second class the pixels in motion are considered for which a number has been confirmed in the vicinity of the latter greater than the motion detection threshold of pixels presenting a variation in positive amplitude greater than the positive value of the amplitude threshold +A; these pixels are then considered as corresponding to the trace of the object, that is, to a background zone where the object was located in the preceding image, but has left this position (for example pixel P of FIG. 5). In a third class fixed pixels are considered, considered as corresponding to noisy background points (for example pixel F of FIG. 5).

Motion detection in a particular pixel is based, as described above, on observation of the variation in amplitude of a plurality of pixels in the vicinity of the particular pixel, for which the risk of false detection is taken into consideration. The first risk is effectively to decide that a pixel is in motion, while it is fixed; the second risk is that of deciding that a pixel is fixed while it is in motion. As will be described below, as a function of this decision, the pixels are filtered differently. As a consequence, it is useful to consider the impact of false detection and to eliminate this risk. Therefore it is desirable to determine for each pixel the probability that this pixel belongs to one or the other of each of the three classes mentioned hereinabove.

A probability f is thus determined that the pixel is a fixed pixel (pixel of class 3), a probability n that it is a pixel in motion corresponding to a trace of the object (class 2), and a probability p that it is a pixel in motion corresponding to the object (class 1). These probabilities f, n, p, are indicated by using an amplitude threshold determined according to the classic theory of hypothesis tests as a function of the CNR ratio of the object, of the standard deviation of the noise s, and likewise provides a motion detection threshold, the optimum decision threshold in terms of errors of first and second species, having to be taken into consideration to conclude the existence or the absence of motion. The error of first species is consecutive to deciding on the existence of motion while the pixels are fixed and noisy, whereas the error of second species corresponds to the inverse erroneous decision. In the first case, the risk is a slight reduction in noise. In the second case the risk is to filter the object in motion.

The implementation of these probabilities are described with reference to the description of FIG. 4. With reference to the general description of the method according to a first aspect of an embodiment of the invention, the first case comprises processing for reducing the noise in the fluoroscopic image. This processing is more particularly adapted to create different filtering of the pixels of each of the three classes. The processing comprises a time filtering operation of the fixed pixels of class 3. The fixed pixels are thus for example filtered in a classic manner known per se by a recursive time filter whereof the force is fixed.

The processing may not comprise an operation for the pixels in motion corresponding to a zone where the object is in motion. In other terms the pixels of class 1 may not be filtered. In this case their contrast and their visibility should effectively be preserved.

In another possible embodiment, the processing comprises a spatial filtering operation of the pixels of class 1, for example by using a non-linear filter, for example a median filter or a bilateral filter. Such filters are particularly adapted to preserve the contours. The processing can also comprise a spatial filtering operation of the pixels of class 2 corresponding to the trace of the object in motion and thus to the background zones where an object was present in the preceding image. This processing helps reducing the residual tails of noise which appear in the implementation of the processes in the state of the art for which there is no proven distinction between the negative and positive difference pixels (that is, between the pixels of class 1 corresponding to the object in motion and the pixels of class 2 corresponding to the trace of the object).

However, spatial filtering (median or bilateral) is likely to produce <<blotchy>> artefacts since it partially reduces the variability of the background zones that can be close to other background zones filtered differently (that is, zones corresponding to pixels of class 3). In order to limit the appearance of such artefacts, a controlled quantity of high-frequency noise is injected to the result of the spatial filtering operation of the pixels of class 2. Such an injection of noise actually allows all the background regions to be imparted a homogeneous appearance in terms of noise granularity. The re-injected noise can be extracted from the image itself at the location where this noise is present in the image.

Certain characteristics of the bilateral filter to be utilized in the processing of the pixels of class 1 are discussed below. The objective of bilateral filtering is to reduce noise without altering the contrast of the object in movement. The size of the core of the bilateral filter can thus be selected as being at least equal to half the maximal size of the object (a catheter 5F enlarged 1.2× typically occupies a zone of 16 pixels on a detector of a pitch of 0.2 millimeters). In addition, the selection can be made to limit the densitometric deviation between the pixels in the vicinity and the central pixel at half the amplitude A of the object.

Furthermore, in consideration of performances of real-time processing, the following simplifications can be used, without significantly altering the quality of the filtering. For example, a bilateral filter of the boxcar filter type where the coefficients are all equal can be selected. Only two values (0 or 1) can also be taken from the coefficients of the densitometric core so as to limit the number of operations to be done (in such a theoretical case it is actually not necessary to use multipliers). Square root coding can also be applied to the source image to transform its multiplicative quantic noise into an additive noise independent of the local intensity. The coefficients of the densitometric core are then determined by comparing each of the densitometric deviations to a constant threshold.

Figure 3:
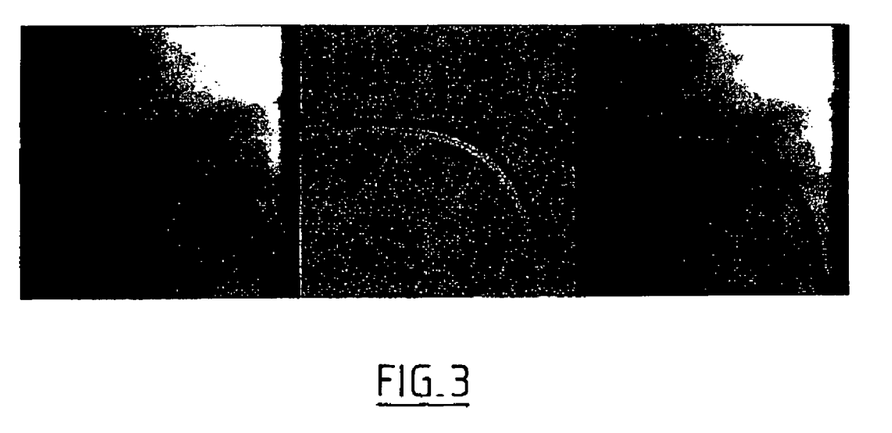
FIG. 3 illustrates to the left a fluoroscopic image acquired at a time t, at the center the image difference between the image acquired at the instant t−1 and that acquired at the instant t, and to the right the filtered image obtained by implementing an embodiment of the method according to the present invention.

FIG. 3 shows the results of the filtering of a zone in which a catheter is moved. The noise tail is not visible on the processed image, shown to the right in FIG. 3 (this tail being the zone in white on the image difference at the center of FIG. 3).

Figure 4:
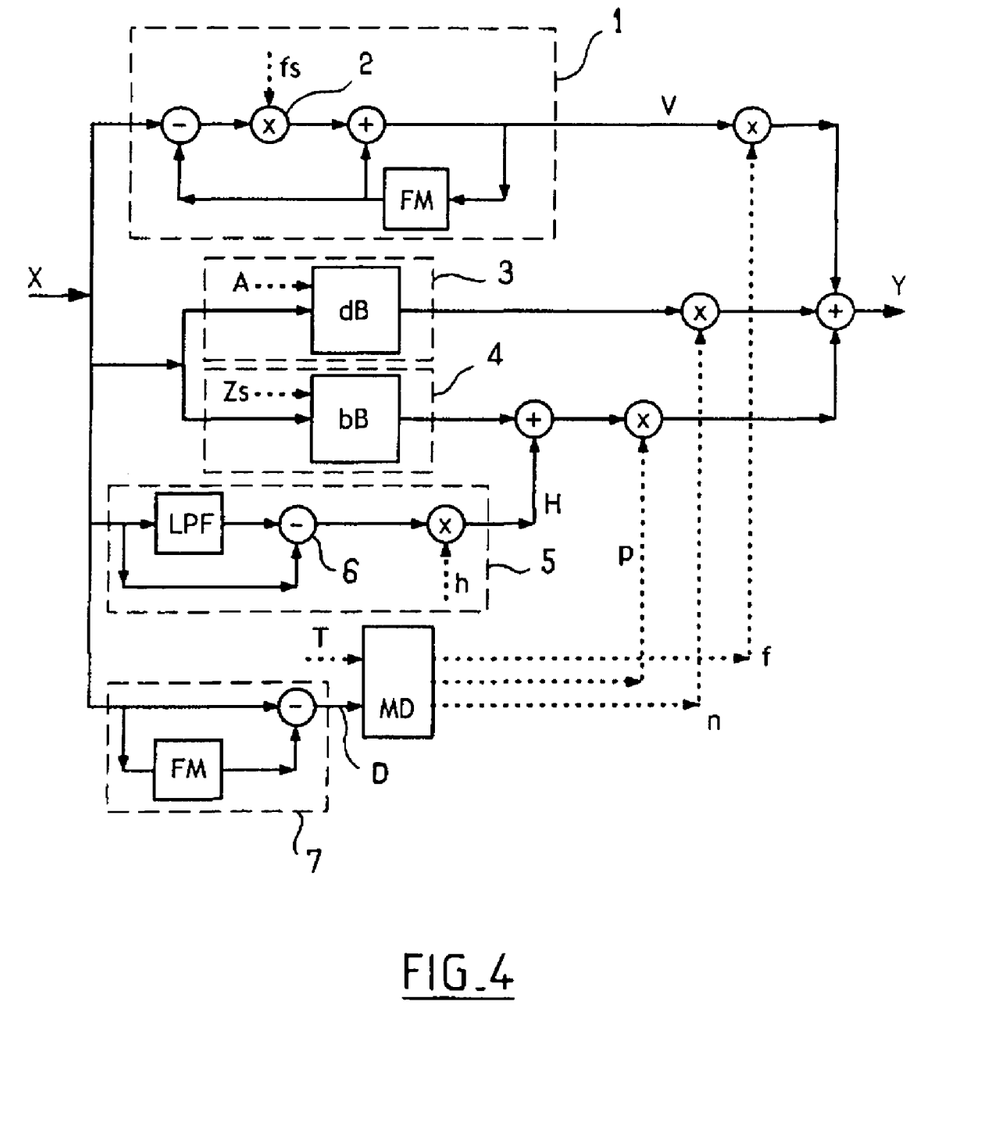
FIG. 4 illustrates an embodiment of the means of the radiological apparatus of FIG. 1 suitable for implementing an embodiment of the method according to the invention.

FIG. 4 shows means for processing of a radiological apparatus. A source image X of a sequence of fluoroscopic images is processed in parallel by different blocks. These different blocks enable operations intended for processing the pixels of each of the described three classes. The outputs of these blocks are then combined to provide a processed image Y. This combination is implemented as a function of the probabilities described above and intended to minimize the risk of false detection of the motion.

Block 1 carries out recursive time filtering of force fs of the source image X to obtain an image V. Block 1 comprises a multiplier 2 applied to control the force fs of the filter (simple shifting can be performed all the same, in which case the force fs is equal to ½), as well as an images memory FM adapted to temporarily store an image (typically over a period separating the acquisition of two successive fluoroscopic images). In block 3 bilateral filtering dB is applied to the object in motion and provided for processing the pixels of class 1. The amplitude A of the object having to be filtered is linked to the CNR ratio and to the standard deviation s of the noise. This amplitude A controls the bilateral filter dB. In block 4 bilateral filtering bB applied to the trace of the object and provided to process the pixels of class 2. A parameter Z and the standard deviation s of the noise together control the force of the bilateral filter bB. Block 5 shows a high-frequency noise estimator, by means of a low-pass filter LPF and a subtractor 6. The output of the subtractor 6 is weighted by means of a factor h, before being combined with the output of block 3 (bilateral filter bB) so as to reduce the <<blotchy>> artefacts likely to be observed. Factor h is for example determined by considering that the residual noise in a spatially filtered region would have to be perceived as the residual noise of a time-filtered region. Block 7 shows the calculation of the difference image D between the source image X and the preceding source image stored temporarily in an image memory FM. The difference image D is provided at the input of a module MD for detecting the motion as indicated previously. A motion threshold T controls the module MD.

Module MD generates three outputs: a probability f of being in a fixed zone, a probability p of being in a zone of positive amplitude variation corresponding to the trace of the object, and a probability n of being in a zone of negative amplitude variation corresponding to the object. These three probabilities create a weighted sum of the output of the time filter, of the output of the bilateral filter dB and of the output of the bilateral filter bB (to which is added an additional noise component), to produce the output image Y. Of course, the sum of f+p+n is equal to 1. In an embodiment of the invention, the probabilities f, p, n are expressed in binary.

The disclosed embodiments of the method and processing may include one or more of the following aspects: (1) for a given pixel of the image, detection of the existence or of the absence of motion of the object is realized by counting the number of pixels which, within the set of pixels in the vicinity of the given pixel, present a variation in amplitude between the image and the preceding image greater in absolute value to an amplitude threshold, and by comparing this number to a motion detection threshold; (2) the amplitude threshold corresponds to the average amplitude of the contrast of the object; (3) the motion detection threshold corresponds to the majority of the pixels belonging to said set of pixels in the vicinity; (4) the motion detection threshold corresponds to the number of pixels whereof the amplitude is greater than or equal to the average amplitude when the set of pixels in the vicinity fully covers the object; (5) the stage of motion detection is further adapted to discriminate, among the pixels in motion, those pixels corresponding to a zone where the object is in motion of the pixels corresponding to a background zone where an object was located in the preceding image of the sequence; (6) a given pixel in motion of the image is considered as corresponding to a zone where the object is in motion or respectively as corresponding to a background zone where an object was located in the preceding image of the sequence if the pixels in the vicinity of the pixel, which offer a variation in amplitude between the image and the preceding image greater in absolute value to the amplitude threshold, offer a variation in amplitude less than the negative value of the amplitude threshold or respectively a variation in amplitude greater than the positive value of the amplitude threshold; (7) in the course of processing, no operation is performed for the pixels in motion corresponding to a zone where the object is in motion; (8) the processing comprises a spatial filtering operation of the pixels in motion corresponding to a zone where the object is in motion; (9) spatial filtering is performed by using a bilateral filter; (10) the processing comprises a spatial filtering operation of the pixels in motion corresponding to a background zone where an object was located in the preceding image of the sequence; (11) the processing also comprises an operation aimed at introducing noise at the output of the spatial filtering of the pixels in motion corresponding to a background zone where an object was located in the preceding image of the sequence; and (12) the processing of the image at the same time combines time filtering provided to treat the fixed pixels, spatial filtering provided to treat the pixels corresponding to a zone where the object is in motion and spatial filtering provided to treat the pixels corresponding to a background zone where an object was located in the preceding image of the sequence, the combination of the filterings being realized as a function of the probability that a given pixel is respectively a fixed pixel, a pixel corresponding to a zone where the object is in motion and a pixel corresponding to a background zone where an object was located in the preceding image of the sequence.

In addition, while an embodiment of the invention has been described with reference to exemplary embodiments, it will be understood by those skilled in the art that various changes may be made in the function and/or way and/or result and equivalents may be substituted for elements thereof without departing from the scope and extent of the invention. In addition, many modifications may be made to adapt a particular situation or material to the teachings of the invention without departing from the essential scope thereof. Therefore, it is intended that the invention not be limited to the particular embodiment disclosed as the best mode or any mode contemplated for carrying out this invention, but that the invention will include all embodiments falling within the scope of the appended claims. Moreover, the use of the terms first, second, etc. or steps do not denote any order or importance, but rather the terms first, second, etc. or steps are used to distinguish one element or feature from another. Furthermore, the use of the terms a, an, etc. do not denote a limitation of quantity, but rather denote the presence of at least one of the referenced element or feature.

What is claimed is:

1. A method for reduction of noise in an image of a sequence of fluoroscopic images of an object in motion comprising:
    differentiation of the pixels of the image between pixels in motion and fixed pixels; and
    processing by an operation of time filtering of the fixed pixels, for each pixel of the image;
    the differentiation between pixel in motion and fixed pixel is performed as a function of the result of a detection of the movement during the course of which, in a zone of the image covering a set of pixels in the vicinity of the pixel, the existence or respectively the absence of motion of the object relative to a preceding image is detected.

2. The method as claimed in claim 1 wherein for any given pixel of the image, the detection of the existence or absence of motion of the object is realized by counting the number of pixels which, among the set of pixels in the vicinity of the given pixel, present an amplitude variation between the image and the preceding image greater in absolute value to an amplitude threshold, and by comparing this number to a motion detection threshold.

3. The method as claimed in claim 2 wherein the amplitude threshold corresponds to the average amplitude of the contrast of the object.

4. The method as claimed in claim 3 wherein the motion detection threshold corresponds to the majority of pixels belonging to the set of pixels in the vicinity.

5. The method as claimed in claim 3 wherein the motion detection threshold corresponds to the number of pixels which amplitude is greater than or equal to the average amplitude when the set of pixels in the vicinity fully covers the object.

6. The method as claimed in claim 5 wherein the motion detection threshold is expressed according to $T=dM+[M^2+dM][1-F(z)]$, where $M*M$ is the number of pixels of the set, dM is the number of pixels of the ensemble covered by the object, F is the noise distribution function and z represents the number of standard deviations contained in A ($CNR/\sqrt{2}$).

7. The method as claimed in claim 2 wherein the motion detection is also adapted to discriminate, among the pixels in motion, the pixels corresponding to a zone where the object is in motion from the pixels corresponding to a background zone where an object was located in the preceding image of the sequence.

8. The method as claimed in claim 3 wherein the motion detection is also adapted to discriminate, among the pixels in motion, the pixels corresponding to a zone where the object is in motion from the pixels corresponding to a background zone where an object was located in the preceding image of the sequence.

9. The method as claimed in claim 4 wherein the motion detection is also adapted to discriminate, among the pixels in motion, the pixels corresponding to a zone where the object is in motion from the pixels corresponding to a background zone where an object was located in the preceding image of the sequence.

10. The method as claimed in claim 5 wherein the motion detection is also adapted to discriminate, among the pixels in motion, the pixels corresponding to a zone where the object is in motion from the pixels corresponding to a background zone where an object was located in the preceding image of the sequence.

11. The method as claimed in claim 6 wherein the motion detection is also adapted to discriminate, among the pixels in motion, the pixels corresponding to a zone where the object is in motion from the pixels corresponding to a background zone where an object was located in the preceding image of the sequence.

12. The method as claimed in claim 7 wherein a given pixel in motion of the image is considered as corresponding to a zone where the object is in motion or respectively as corresponding to a background zone where an object was located in the preceding image of the sequence if the pixels in the vicinity of the pixel which present a variation in amplitude between the image and the preceding image greater in absolute value to the amplitude threshold present a variation in amplitude less than the negative value of the amplitude threshold or respectively a variation in amplitude greater than the positive value of the amplitude threshold.

13. The method as claimed in claim 8 wherein the motion detection is also adapted to discriminate, among the pixels in motion, the pixels corresponding to a zone where the object is in motion from the pixels corresponding to a background zone where an object was located in the preceding image of the sequence.

14. The method as claimed in claim 9 wherein the motion detection is also adapted to discriminate, among the pixels in motion, the pixels corresponding to a zone where the object is in motion from the pixels corresponding to a background zone where an object was located in the preceding image of the sequence.

15. The method as claimed in claim 10 wherein the motion detection is also adapted to discriminate, among the pixels in motion, the pixels corresponding to a zone where the object is in motion from the pixels corresponding to a background zone where an object was located in the preceding image of the sequence.

16. The method as claimed in claim 11 wherein the motion detection is also adapted to discriminate, among the pixels in motion, the pixels corresponding to a zone where the object is in motion from the pixels corresponding to a background zone where an object was located in the preceding image of the sequence.

17. The method as claimed in claim 7 wherein over the course of the processing, no operation is performed for the pixels in motion corresponding to a zone where the object is in motion.

18. The method as claimed in claim 12 wherein over the course of the processing, no operation is performed for the pixels in motion corresponding to a zone where the object is in motion.

19. The method as claimed in claim 7 the processing comprises a spatial filtering operation of the pixels in motion corresponding to a zone where the object is in motion.

20. The method as claimed in claim 12 the processing comprises a spatial filtering operation of the pixels in motion corresponding to a zone where the object is in motion.

21. The method as claimed in claim 19 wherein the spatial filtering is implemented by using a bilateral filter.

22. The method as claimed in claim 20 wherein the spatial filtering is implemented by using a bilateral filter.

23. The method as claimed in claim 7 wherein the processing comprises a spatial filtering operation of the pixels in motion corresponding to a background zone where an object was located in the preceding image of the sequence.

24. The method as claimed in claim 12 wherein the processing comprises a spatial filtering operation of the pixels in motion corresponding to a background zone where an object was located in the preceding image of the sequence.

25. The method as claimed in claim 17 wherein the processing comprises a spatial filtering operation of the pixels in motion corresponding to a background zone where an object was located in the preceding image of the sequence.

26. The method as claimed in claim 19 wherein the processing comprises a spatial filtering operation of the pixels in motion corresponding to a background zone where an object was located in the preceding image of the sequence.

27. The method as claimed in claim 21 wherein the processing comprises a spatial filtering operation of the pixels in motion corresponding to a background zone where an object was located in the preceding image of the sequence.

28. The method as claimed in claim 23 wherein the spatial filtering is implemented by using a bilateral filter.

29. The method as claimed in claim 24 wherein the spatial filtering is implemented by using a bilateral filter.

30. The method as claimed in claim 25 wherein the spatial filtering is implemented by using a bilateral filter.

31. The method as claimed in claim 26 wherein the spatial filtering is implemented by using a bilateral filter.

32. The method as claimed in claim 27 wherein the spatial filtering is implemented by using a bilateral filter.

33. The method as claimed in claim 12 wherein the processing comprises an operation for introducing noise at the output of the spatial filtering of the pixels in motion corresponding to a background zone where an object was located in the preceding image of the sequence.

34. The method as claimed in claim 28 wherein the processing comprises an operation for introducing noise at the output of the spatial filtering of the pixels in motion corresponding to a background zone where an object was located in the preceding image of the sequence.

35. The method as claimed in claim 7 wherein the processing of the image simultaneously combines time filtering provided to process the fixed pixels, spatial filtering provided to process the pixels corresponding to a zone where the object is in motion and spatial filtering provided for the pixels corresponding to a background zone where an object was located in the preceding image of the sequence, the combination of the filterings being done as a function of the probability that a given pixel is respectively a fixed pixel, a pixel corresponding to a zone where the object is in motion and a pixel corresponding to a background zone where an object was located in the preceding image of the sequence.

36. The method as claimed in claim 12 wherein the processing comprises an operation for introducing noise at the output of the spatial filtering of the pixels in motion corresponding to a background zone where an object was located in the preceding image of the sequence.

37. A radiological apparatus comprising:
 means for radiographic exposure to provide a sequence of images;
 means for emission of radiation; and
 means for reduction of noise in the images of an object in motion comprising:
  differentiation of the pixels of the image between pixels in motion and fixed pixels; and
  processing by an operation of time filtering of the fixed pixels, for each pixel of the image;
  the differentiation between pixel in motion and fixed pixel is performed as a function of the result of a detection of the movement during the course of which, in a zone of the image covering a set of pixels in the vicinity of the pixel, the existence or respectively the absence of motion of the object relative to a preceding image is detected.

38. A computer program comprising program code means for implementing the method according to claim 1 when the program runs on a computer.

39. A computer program product comprising a computer useable medium having computer readable program code means embodied in the medium, the computer readable program code means implementing the method according to claim 1.

40. An article of manufacture for use with a computer system, the article of manufacture comprising a computer readable medium having computer readable program code means embodied in the medium, the program code means implementing the method according to claim 1.

41. A program storage device readable by a machine tangibly embodying a program of instructions executable by the machine to perform the method according to claim 1, the program of instructions embodied in a medium.

* * * * *

UNITED STATES PATENT AND TRADEMARK OFFICE
CERTIFICATE OF CORRECTION

PATENT NO.       : 7,599,575 B2                                                        Page 1 of 1
APPLICATION NO.  : 11/409836
DATED            : October 6, 2009
INVENTOR(S)      : Lienard et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 744 days.

Signed and Sealed this

Twenty-eighth Day of September, 2010

David J. Kappos
*Director of the United States Patent and Trademark Office*